United States Patent
Liu et al.

(10) Patent No.: US 10,331,381 B2
(45) Date of Patent: Jun. 25, 2019

(54) METHOD AND DEVICE FOR RECORDING MEMORY ACCESS OPERATION INFORMATION

(71) Applicant: Tsinghua University, Beijing (CN)

(72) Inventors: Leibo Liu, Beijing (CN); Ao Luo, Beijing (CN); Shaojun Wei, Beijing (CN)

(73) Assignee: Tsinghua University, Beijing (CN)

( * ) Notice: Subject to any disclaimer, the term of this patent is extended or adjusted under 35 U.S.C. 154(b) by 3 days.

(21) Appl. No.: 15/895,145

(22) Filed: Feb. 13, 2018

(65) Prior Publication Data
US 2018/0239558 A1 Aug. 23, 2018

(30) Foreign Application Priority Data

Feb. 20, 2017 (CN) .......................... 2017 1 0089783
Apr. 1, 2017 (CN) .......................... 2017 1 0213086

(51) Int. Cl.
*G06F 3/06* (2006.01)

(52) U.S. Cl.
CPC .......... *G06F 3/0659* (2013.01); *G06F 3/0604* (2013.01); *G06F 3/0622* (2013.01); *G06F 3/0653* (2013.01); *G06F 3/0656* (2013.01); *G06F 3/0673* (2013.01)

(58) Field of Classification Search
None
See application file for complete search history.

(56) References Cited

U.S. PATENT DOCUMENTS

2012/0167209 A1* 6/2012 Molnar ................. G06F 21/54
726/22
2017/0235961 A1* 8/2017 August ................. G06F 21/75
713/189

OTHER PUBLICATIONS

Office action dated Oct. 22, 2018 issued in corresponding CN patent application No. 201710089783.9 (and English translation thereof).
Office action dated Aug. 23, 2018 issued in corresponding CN patent application No. 201710089783.9 (and English machine translation attached).
Office action dated Aug. 27, 2018 issued in corresponding CN patent application No. 201710213086.X (and English machine translation attached).

(Continued)

*Primary Examiner* — Michael Alsip
(74) *Attorney, Agent, or Firm* — Posz Law Group, PLC

(57) ABSTRACT

A method and a device for recording memory access operation information are provided by the present disclosure. The method comprises: recording memory access operations between a processor and a memory during a target running process to form an memory access sequence information of the target running process, wherein each of the memory access operation information in the memory access sequence information includes a memory access type, a memory access address and a memory access data; and determining a final storage state of the memory during the target running process according to the memory access sequence information of the target running process. According to the embodiments of the present disclosure, the final storage state of the memory during the target running process may be obtained by using less storage resources, and the hardware overhead is reduced.

16 Claims, 5 Drawing Sheets recording a memory access operations between a processor and a memory during a target running process to form a memory access sequence information of the target running process — S101 determining a final storage state of the memory during the target running process according to the memory access sequence information of the target running process — S102

(56) References Cited

OTHER PUBLICATIONS

Dissertation submitted to PLA Information Engineering University for the Degree of Doctor of Engineering titled "Research on Detection Techniques of Instruction-triggered Hardware Trojan Horse" authored by Hongbo Gao and Prof. Liqingbao, dated Apr. 2013, pp. 1-116 (and English translation of abstract).

* cited by examiner

METHOD AND DEVICE FOR RECORDING MEMORY ACCESS OPERATION INFORMATION

CROSS-REFERENCE TO RELATED APPLICATION(S)

This application claims priority to a Chinese Patent Application No. 201710089783.9, filed with the Chinese Patent Office on Feb. 20, 2017 and entitled "method, checking device and system for determining security of a processor" and a Chinese Patent Application No. 201710213086.x, filed with the Chinese Patent Office on Apr. 1, 2017 and entitled "method and device for recording memory access operation information", which are incorporated herein by reference entirely.

TECHNICAL FIELD

The present disclosure relates to the field of computer technology, and more particularly, to a method and a device for recording a memory access operation information.

BACKGROUND

With the large-scale application of new technologies such as network informatization, an information security has become an increasingly serious problem. The information security that we usually discuss is limited to network security, software security, and the like, but the recent studies show that hardware security should also be concerned about.

The scale of hardware design is increasing with the increasing level of hardware design, which makes hardware Trojans possible: the source of hardware intellectual property used in the large-scale circuit represented by CPU (central processor) is currently diversified, and the hardware design process is complicated as a result, factors such as the division of labor in the design and manufacturing process have resulted in a decrease in the security controllability of the final hardware product. The possibility of being infiltrated with malicious Trojans or vulnerabilities (hereafter referred to as Trojans) in the design increases, and the increase in hardware scale also increases the difficulty of recognizing and discovering Trojans. In recent years, with the development of the concept of the information security, the hardware security has gradually become the research focus of the information security.

Therefore, in the process of checking hardware security, how to design solutions to reduce the hardware and software overhead has become an important issue.

SUMMARY

In order to solve the above problems in the prior art, an object of the present disclosure is to provide a method and a device for recording a memory access operation information that obtains a final storage state of the memory during a target running process by using less storage resources, which reduces the hardware overhead.

One aspect of the embodiments of the present disclosure provides a method for recording a memory access operation information, the method comprising: recording the memory access operation between a processor and a memory during a target running process to form a memory access sequence information of the target running process, wherein each of the memory access operation information in the memory access sequence information includes a memory access type, a memory access address and a memory access data; and determining a final storage state of the memory during the target running process according to the memory access sequence information of the target running process.

Another aspect of the embodiments of the present disclosure provides a device for recording a memory access operation information, the device comprising: a memory access operation recording unit configured to record memory access operations between a processor and a memory during a target running process to form a memory access sequence information of the target running process, wherein each of the memory access operation information in the memory access sequence information includes a memory access type, a memory access address and a memory access data; and a data organization unit configured to determine a final storage state of the memory during the target running process according to the memory access sequence information of the target running process.

According to the embodiments of the present disclosure described above, the memory access operations between a processor and a memory during a target running process are recorded and a final running state of the processor is determined through the memory access sequence information. In this way, the final storage state of the memory during the target running process may be obtained by using less storage resources, and the hardware overhead is reduced.

BRIEF DESCRIPTION OF THE DRAWINGS

In order to more clearly illustrate technical solutions in embodiments of the present disclosure or in the prior art, the attached drawings, which are to be used in the following descriptions of the embodiments or the prior art, will be briefly described below. It is apparent that the attached drawings in the following descriptions are merely examples of the present disclosure, and other drawings may be obtained by those skilled in the art based on these drawings without creative efforts.

DETAILED DESCRIPTION

Figure 1:
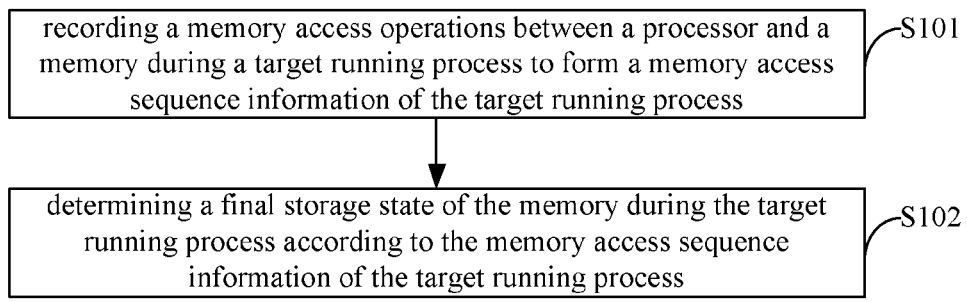
FIG. 1 is a flow diagram of a method for recording a memory access operation information according to an embodiment of the present disclosure.

The technical solutions in the embodiments of the present disclosure will be described in a clear and complete manner in conjunction with the attached drawings in the embodiments of the present disclosure, and obviously, the described embodiments are merely part of the present disclosure, and not all embodiments. All other embodiments obtained by those skilled in the art based on the embodiments of the present disclosure without creative work should fall within the protection scope of the present disclosure.

Hardware security is a basis of software security. All implementations of the software security are based on an assumption that hardware is trusted, i.e., the hardware should work according to a behavior defined by its manual. Currently in most cases, checking for hardware is carried out when designing or leaving the factory. Since hardware appears in the form of a black box in a user's system after leaving the factory (unlike software Trojan, code of which is present in a system, and can be read and analyzed), it is difficult for the hardware behavior to be monitored or perceived. In addition, due to the difficulty in determining the reasonability of the hardware behavior, there is little research on hardware security. The inventors have found that the storage state of the memory is one of the important metrics during processor security checking. The easiest way to get a memory image is to copy the contents of the entire memory to obtain the storage state of the memory in the checking interval. However, this approach is inefficient and consumes more resources.

The method and device for recording a memory access operation information provided by the present disclosure records a memory access operation between a processor and a memory during a target running process and determines a final running state of the processor through the memory access sequence information. In this way, the final storage state of the memory during the target running process may be obtained by using less storage resources, and the hardware overhead is reduced. The method for recording a memory access operation information in the embodiments of the present disclosure may be executed by the device for recording a memory access operation information. It should be understood that the device for recording a memory access operation information may be implemented as a part of the checking device (the device that determines the security of the processor based on the memory access operation information). In particular, the device may be integrated with the processor on a same chip, or may be implemented on a separate chip, or may be implemented as other forms of devices, and it is limited to the present invention. For example, a portion of functions of the embodiments of the present invention may be integrated with the checked processor on the same chip, and the remaining functions may be implemented as a separate chip, and these variations should all fall within the protection scope of the present invention.

Various design considerations for determining security of a processor are further described in a U.S. application Ser. No. 15/804,188, filed on Nov. 6, 2017 and entitled "METHOD, CHECKING DEVICE, AND SYSTEM FOR DETERMINING SECURITY OF A PROCESSOR", which is incorporated herein by reference in their entirety as part of disclosure of the present application.

FIG. 1 is a schematic flow diagram of a method for recording a memory access operation information according to an embodiment of the present disclosure. As shown in FIG. 1, the method includes the following steps.

Step S101: recording memory access operations between a processor and a memory during a target running process to form a memory access sequence information of the target running process, wherein each of the memory access operation information in the memory access sequence information includes a memory access type, a memory access address and a memory access data.

Generally, the memory described here includes on-chip memory and off-chip memory. The on-chip memory may be, for example, a memory of a processor chip. The off-chip memory may be, for example, a hard disk, a U disk, a memory, and the like, which is not limited in the present disclosure. It should be understood that the memory access type includes a read operation and a write operation. The memory access address refers to an address of the current memory access operation. The memory access data refers to a data read or written in the current memory access operation.

Step S102: determining a final storage state of the memory during the target running process according to the memory access sequence information of the target running process. In an embodiment, the final storage state may be used to determine whether the processor is secure during the target running process. For example, the checking device may determine whether the processor is secure during the target running process according to the final storage state of the memory.

It should be understood that the method and device for recording a memory access operation information provided by the present disclosure can be applied not only to the above-mentioned field of hardware security checking but also to other technical fields without departing from the spirit and principle of the present invention, which should fall within the scope of the present invention.

It is to be understood that the final storage state of the memory during the target running process refers to the final storage state of the memory space operated by the processor during the target running process. The memory space operated by the processor may include a read-only memory space, a write-only memory space, and a read-write memory space. The read-only memory space means that the processor only performs read operations on the memory space during the target running process. Similarly, the write-only memory space means that the processor only performs write operations on the memory space during the target running process, and the read-write memory space means that the processor performs both of read and write operations on the memory space during the target running process. In an embodiment, the final storage state may include only the ultimate storage state in the write-only memory space and the read-write memory space. In another embodiment, the final storage state may include the ultimate storage state in the read-only memory space, the write-only memory space and the read-write memory space.

It should also be understood that the last write operation of the processor may be obtained based on the final storage state of the memory. For example, the final storage state is equal to the last write operation of the processor when the final storage state includes only the ultimate storage state in the write-only memory space and the read-write memory space. Specifically, the rankings of each of the memory access operation information in the memory access sequence information may indicate the time order of each of the memory access operation. In this way, the final storage state of the memory can be obtained by sequentially traversing each of the memory access operation information according to the time order of each of the memory access operations. In other words, the last-time write operation of the processor on each of the memory spaces may be obtained, and then it may be determined whether the processor is secure by using the final storage state/last-time write operation.

In an embodiment, a running process of the checked processor may be divided into one or more checking intervals when determining whether the processor is secure. For example, an entire running process of the checked processor from startup to shutdown may be taken as a target running process, or the entire running process may be divided into multiple target running processes corresponding to multiple checking intervals. In this way, a security check on the processor may be implemented as a security check for a running process (i.e., a target running process) of the processor in a certain checking interval.

Figure 2:
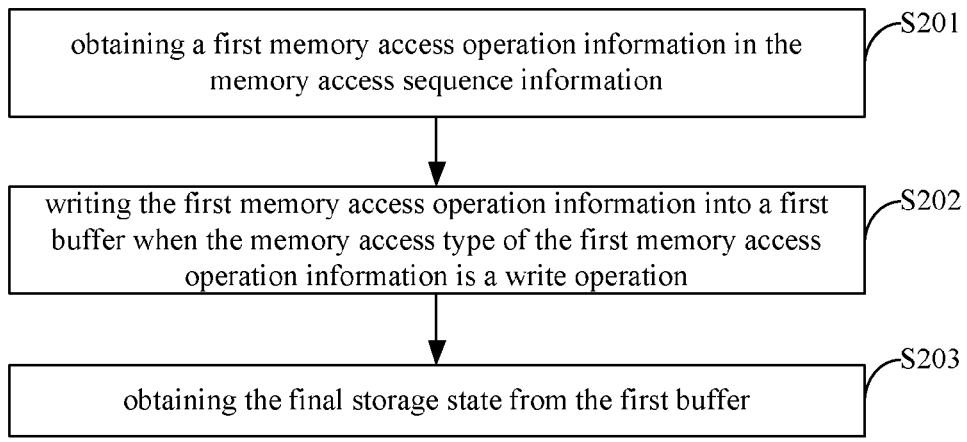
FIG. 2 is a flow chart of determining the final storage state according to an embodiment of the present disclosure.

In an embodiment, obtaining final storage state of the memory during the target running process according to the memory access sequence information of the target running process may be implemented according to the steps shown in FIG. 2.

Step S201: obtaining first memory access operation information in the memory access sequence information. It should be understood that the first memory access operation information herein is an alternative name that can be used to refer to any memory access operation information in the memory access sequence information.

Step S202: writing the first memory access operation information into a first buffer when the memory access type of the first memory access operation information is a write operation. To distinguish from the latter buffers, the buffer here is denoted as the first buffer.

In step S203, sequentially traversing each of the memory access operation information in the memory access sequence and obtaining the final storage state from the first buffer after all of the memory access operation information corresponding to write operations in the memory access sequence information are written into the first buffer.

In the embodiment described above, when writing the first memory access operation information into the first buffer in the step S202, the memory access operation information corresponding to the write operation may be directly written into the first buffer without being compared with the content in the first buffer, which may result in an increase in the amount of information recorded in the first buffer. For example, a same address may correspond to a number of memory access records. In this way, the content of the last write operation in the same address needs to be obtained when obtaining the final storage state.

For the same memory access address, only the last record needs to be used. Therefore, when writing the memory access operation information corresponding to the write operation into the first buffer, the memory access operation information may be compared with the contents recorded in the first buffer, and then written into the first buffer in an overriding or inserting manner. This ensures that the same address in the first buffer corresponds to one record, reducing the amount of information recorded in the first buffer.

In an embodiment, when the memory access type of the first memory access operation information is a write operation, when writing the first memory access operation information into the first buffer, it is generally determined firstly whether the memory access address of the first memory access operation information is already recorded in the first buffer. The first memory access operation information is written into the first buffer to overwrite a previous memory access operation information if the memory access address of the first memory access operation information is already recorded in the first buffer; and the first memory access operation information is inserted into the first buffer if the memory access address of the first memory access operation information is not recorded in the first buffer.

In an embodiment, the memory access operation information corresponding to a first-time read operation of the memory access address involved in the target running process is obtained according to the memory access sequence information acquired by the step S101. Then the memory access data in the memory access operation information corresponding to the first-time read operation of each of the memory access addresses is taken as input information or initial running state of a checking device, such that the checking device executes a task of the target running process in a manner conforming to a predefined behavior. It should be understood that the first-time read operation is for the same address, and different addresses have different first-time read operations. For example, for a particular memory address, the processor may perform multiple read operations, the first of which is the so-called first-time read operation of the present disclosure.

The predefined behavior is the hardware behavior standard of the processor, wherein the hardware behavior standard refers to a behavior standard of the processor in a process of parsing and executing software instruction streams. In an embodiment, the hardware behavior standard of the processor may be a behavior standard specified in a processor specification or other standardized documents. For example, for an instruction set processor, the predefined behavior may include: an instruction behavior specified in an instruction set implemented by the processor, a behavior of responding to and processing an interrupt, and a behavior of input and output ports of the processor, and the like. In an embodiment, a processor in the checking device may be designed in advance according to the hardware behavior standard of the processor, thereby enabling the checking device to conform to the predefined behavior during the running process.

Since the checked processor is a black box for a user, it is unknown whether or not in an actual running process it executes a task of the target running process in a manner conforming to the predefined behavior. Therefore, it is an important basis for determining the hardware security by comparing similarities and differences between a hardware execution trace of the checked processor and that of the checking device when executing the same task. Here, the predefined behavior may be defined and modified by a user, which has a good portability, and may be applied to security checks for different models of processors, thereby solving the problem of the hardware black box of the processors.

In an embodiment, when obtaining memory access operation information corresponding to a first-time read operation during the target running process from the memory access sequence information, second memory access operation information may be obtained from the memory access sequence information first. Then, it is determined whether the memory access type of the second memory access operation information is a read operation; if it is a read operation, the second memory access operation information is written into a buffer, herein denoted as the second buffer. In this way, when the checking device performs the task in the target running process, the memory access data for the first-time read operation may be obtained from the second buffer as the input information. Alternatively, the checking device obtains the first-time read operation as the initial running state of the checking interval. It should be understood that, both of the second memory access operation information and the above-mentioned first memory access operation information are alternative names, and they may refer to the same memory access operation information. It should also be understood that the checking device may obtain the memory access data for the first-time read operation from the second buffer in real time without waiting for the target running process to finish.

In an embodiment, since the input information of the checking device is the memory access data in the memory access operation information corresponding to the first-time read operation, when obtaining the memory access operation information corresponding to the first-time read operation from the second buffer, it only needs to read the memory access data in the memory access operation information corresponding to each of the first-time read operations, without having to read the memory access address and the memory access type in the memory access operation information corresponding to each of the first-time read operation.

In an embodiment, when the memory access type for the second memory access operation information is a read operation, it may be determined firstly whether the same information as the second memory access operation information is already recorded in the second buffer. If the same memory access operation information as the memory access operation information corresponding to the read operation is already recorded, then the memory access operation information corresponding to the second operation may be discarded without being written into the second buffer.

Figure 3:
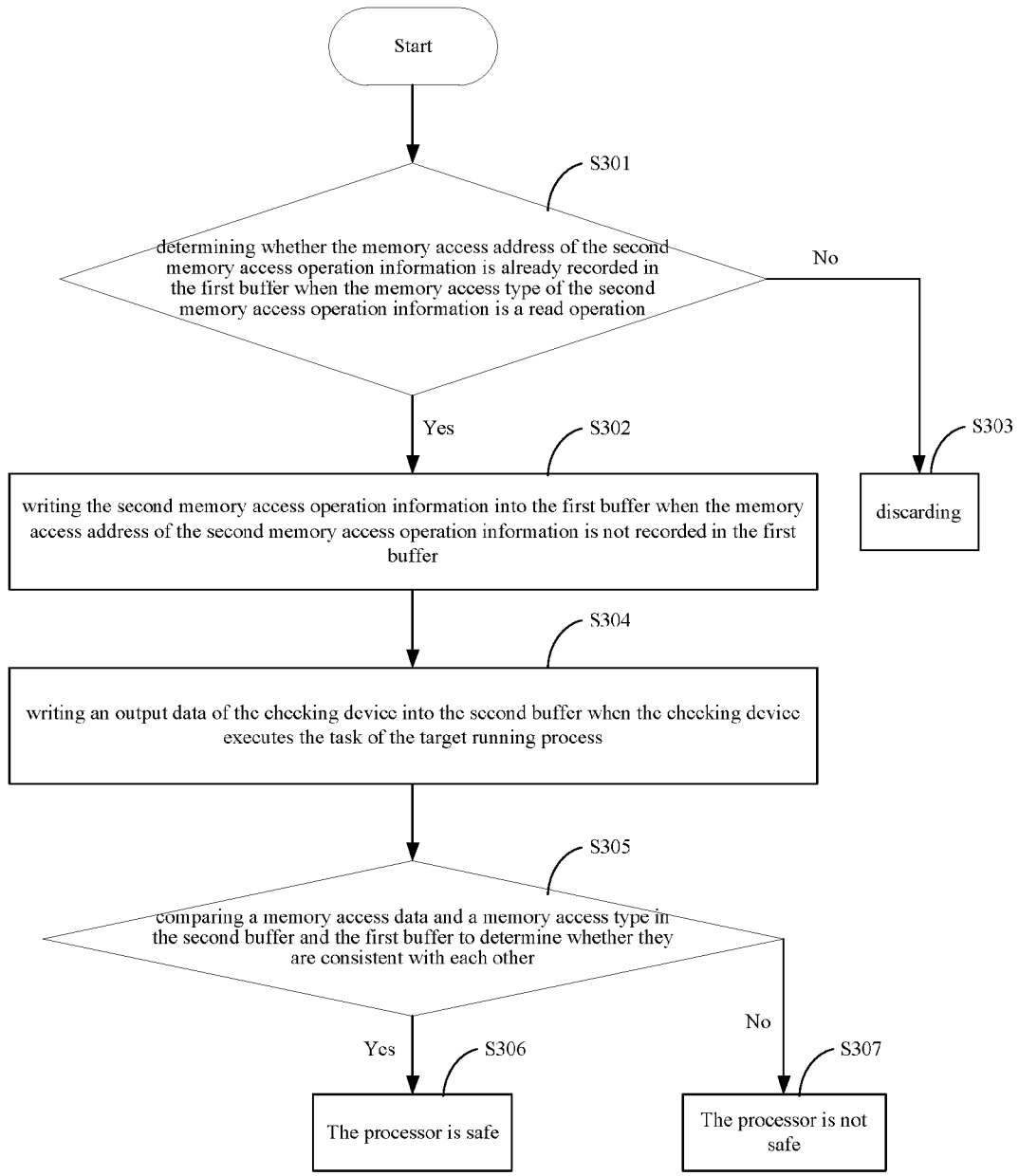
FIG. 3 is a schematic flow diagram of determining whether the processor is secure based on the memory access operation information according to an embodiment of the present disclosure.

In an embodiment, when the checking device checks the security of the processor based on the memory access operation information after the memory access operation information is recorded, the method further includes the following steps (referring to FIG. 3).

Step S301: further determining whether the memory access address of the second memory access operation information is already recorded in the first buffer when the memory access type of the second memory access operation information is a read operation.

Step S302: writing the second memory access operation information into the first buffer when the memory access address of the second memory access operation information is not recorded in the first buffer. Step S303: discarding the second memory access operation information when the memory access address of the second memory access operation information is already recorded in the first buffer.

To summarize, each of the memory access operation information in the memory access sequence information may be sequentially traversed. If the memory access operation information is a write operation, it is written into the first buffer. If it is a read operation, it is written into the second buffer. Meanwhile, it is determined whether the corresponding memory access address is recorded in the first buffer, and if not, the memory access operation information is further written into the first buffer.

Step S304: writing output data of the checking device into the second buffer when the checking device executes the task of the target running process. In this way, the second buffer is not only used to store the memory access operation information, but also used by the checking device to store the output information of the checking device, thereby saving the storage resources. It should be understood that the checking device may also write the output data into other memories, and the protection scope of the embodiments of the present disclosure is not limited thereto.

Before performing the step S304, the memory access operation information whose memory access type is a read operation in the memory access sequence information is already recorded in the second buffer. Therefore, when the output data of the checking device is written into the second buffer, if the memory access operation with the same memory access address (write address) as that of the output data is already recorded in the second buffer, the previously recorded content in the second buffer will be overwritten when writing the output data into the second buffer. On the other hand, if the memory access operation with the same memory access address (write address) as that of the output data is not recorded in the second buffer, a write address entry may be added to the second buffer to further insert the output data into the second buffer. When determining, by using the embodiment of the present disclosure, whether the processor is secure during the target running process, the determining may be performed according to a step S305.

Step S305: sequentially traversing and comparing memory access data and memory access type corresponding to a same memory access address in the second buffer and the first buffer to determine whether the processor is secure. For example, it may be determined first whether the memory access addresses recorded in the second buffer and the first buffer are the same. If the same memory addresses are not recorded, it is determined that the processor is not secure (step S306). If the memory access addresses recorded in the two buffers are the same, it is also required to determine whether the memory access data and the memory access type in the memory access operation information corresponding to each memory access address are the same. If there is an inconsistency, it is determined that the processor is not secure (step S307). For example, the memory access address, the memory access data and the memory access type of each of the memory access operation information recorded in the second buffer may be sequentially traversed and compared with the first buffer which is used as a comparison reference. If there is an inconsistency, it is determined that the processor is not secure. If they are exactly the same, it is determined that the processor is secure.

It should be understood that the processor security identified in this specification is a temporary security concept. In general, when checking whether a processor is secure, multiple parameters of the processor need to be compared. In this case, "the processor is secure" identified in this specification means it is transiently secure, and all parameters need to be compared to finally determine that the processor is secure. The following example illustrates a complete processor security checking process.

An initial running state of a checking device is set according to initial running state information of the processor during a target running process, and input information of the processor during the target running process is taken as input information of the checking device. The checking device is caused to execute a task of the target running process in a manner conforming to a predefined behavior to obtain output information and/or final running state information of the checking device. The above mentioned predefined behavior is the processor's hardware behavior standards. It is determined whether the processor is secure during the target running process according to the output information and/or the final running state information of the checking device. The initial running state information of the target running process is a data stored in a memory corresponding to a set of feature states at the beginning of the target running process. The final running state information of the target running process is a data stored in a memory corresponding to a set of feature states at the termination of the target running process. The output information and a next running state of the target running process can be determined based on the current running state, the input information, and the set of feature states of the target running process.

The term "final storage state" of the memory as used in the present disclosure may be used to indicate the last-time write operation to the memory by the processor and therefore corresponds to the processor's output information. In this way, the security checking method shown in FIG. 3 is a specific embodiment of determining whether the processor is secure according to the output information. Alternatively, whether the processor is secure or not may be determined according to the output information in real time, or when the checking device has executed the task in the target running process. Then, when the checking device has executed the task in the target running process, it needs to compare the output information and the final running state to finally determine that the processor is secure.

Figure 4:
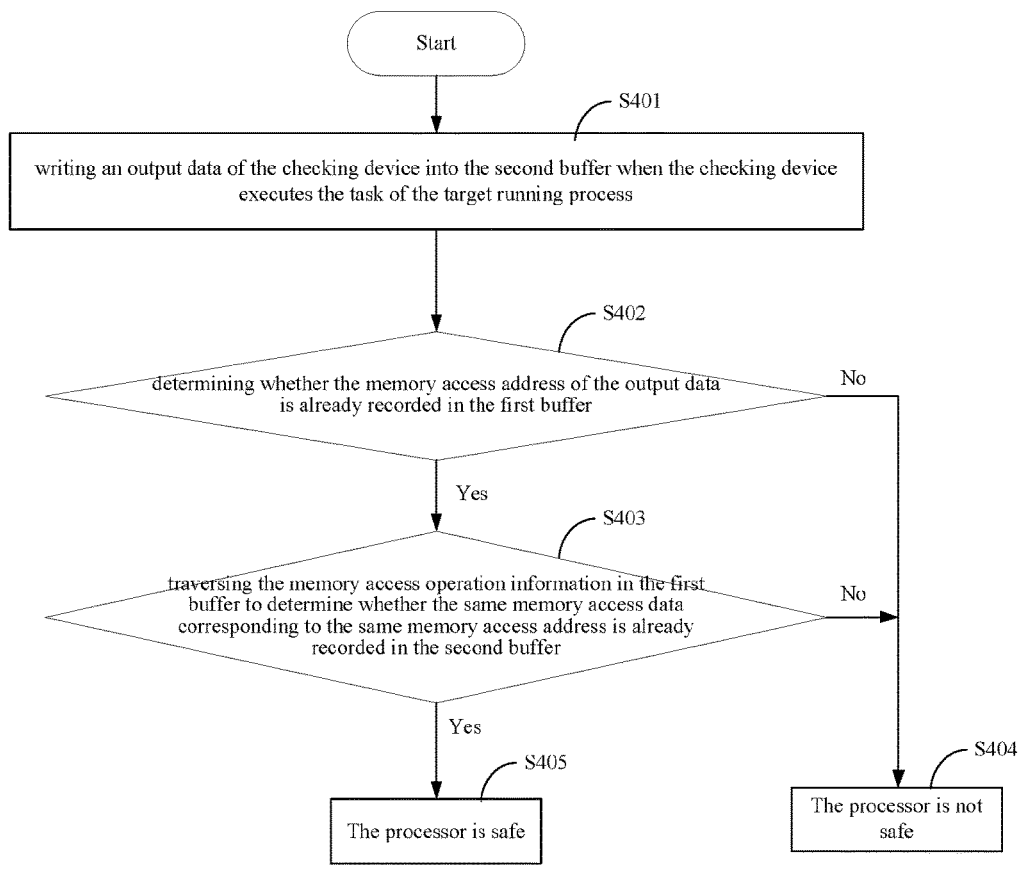
FIG. 4 is a schematic flow diagram of determining whether the processor is secure based on the memory access operation information according to another embodiment of the present disclosure.

In another embodiment, when the checking device performs security checking on the processor, as an alternative to the embodiment shown in FIG. 3, compared with the embodiment shown in FIG. 3, there is no need to write the memory access operation information of the read operation type into the first buffer. For example, when each of the memory access operation information in the memory access sequence information is sequentially traversed, if the memory access operation information is a write operation, it is written into the first buffer. If it is a read operation, it is written into the second buffer. However, it is not necessary to determine whether the corresponding memory access address is recorded in the first buffer, and write it to the first buffer. In this case, the method also includes the following steps (referring to FIG. 4).

Step S401: writing output data of the checking device into the second buffer when the checking device executes the task of the target running process.

Step S402: determining whether the memory access address of the output data is already recorded in the first buffer.

The output data of the checking device may carry other information than the memory access type and the memory access data. When writing the data into the second buffer, it is necessary to ensure that the storage format of the output data is the same as that of the second buffer. For example, at least the memory access type and the memory access data are extracted from the output data and written into the second buffer.

It is determined whether the processor is secure according to the final storage state of the memory during the target running process when the memory access address of the output data is already recorded in the first buffer and the detailed operations may be referred to the step S403. When the memory access address of the output data is not recorded in the first buffer, it is determined that the processor is not secure (step S404). That is to say, when the memory access address of the output data is not recorded in the first buffer, it means that the checked processor writes data less than the checking device, thus it is determined that the checked processor is not secure.

Step S403: traversing the memory access operation information in the first buffer to determine whether a same memory access data corresponding to a same memory access address is already recorded in the second buffer. It is determined that the processor is secure when the same memory access data corresponding to the same memory access address is already recorded in the second buffer (step S405). It is determined that the processor is not secure when the same memory access data corresponding to the same memory access address is not recorded in the second buffer (step S404).

It can be seen from the above embodiment that it is determined that the processor is secure if the memory access address and the memory access data in the first buffer coincide with the memory access address and the memory access data. In the second buffer. When the same memory access address as that in the first buffer is not recorded in the second buffer or the memory access data therein is different, it is determined that the processor is not secure.

In an embodiment, an address range to be checked is obtained before recording the memory access operation between the processor and the memory during the target running process. In this case, the memory access operation to be recorded during the target running process is selected according to the address range to be checked. The address range to be checked may be customized by a user and pre-stored in a readable position of the checking device or other checking device. In this way, the user can customize the memory range of the security checking according to the requirement of the security checking, thereby improving the checking efficiency and flexibility.

The method and device for recording memory access operation information provided by the present disclosure records memory access operation between a processor and a memory during a target running process and determines final running state of the processor through the memory access sequence information. In this way, the final storage state of the memory during the target running process may be obtained by using less storage resources, and the hardware overhead is reduced.

In addition, according to the above embodiment of the present disclosure, memory access operations between a processor and a memory during a target running process are recorded and whether the processor is secure during the target running process is determined according to the obtained final storage state of the memory. Therefore, it is possible to effectively check whether the behavior of the checked processor is abnormal during the target running process, reduce the difficulty of hardware security checking, and improve the security of using the hardware. Meanwhile, the checking content may be customized by a user, which have a good portability, and may be applied to hardware security checks for different models of processors, thereby solving the problem of the hardware black box of the processors and reducing the checking difficulty.

Based on the same inventive concept as the method for recording memory access operation information shown in FIG. 1, a device for recording memory access operation information is further provided by an embodiment of the present disclosure, as described in the following embodiment. Since the principle of solving the problem by the device is similar to that of the method in FIG. 1, the implementation of the device may refer to the implementation of the method shown in FIG. 1, and details are not described herein again.

Figure 5:
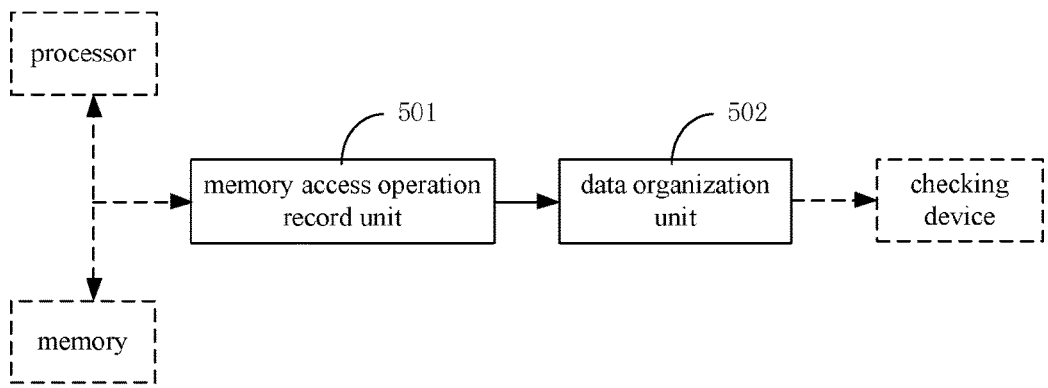
FIG. 5 is a schematic structural diagram of a device for recording a memory access operation information according to an embodiment of the present disclosure.

As shown in the solid line part of FIG. 5, an embodiment of the present disclosure further provides a device for recording memory access operation information, which mainly includes a memory access operation record unit 501 and a data organization unit 502. The memory access operation recording unit 501 is configured to record memory access operations between a processor and a memory during a target running process to form an memory access sequence information of the target running process, wherein each of the memory access operation information in the memory access sequence information includes a memory access type, a memory access address and a memory access data. The data organization unit 502 is configured to determine a final storage state of the memory during the target running process according to the memory access sequence information of the target running process. The final storage state is used to determine whether the processor is secure during the target running process.

The memory access operation recording unit 501 in the embodiment of the present disclosure may be disposed between the processor and the memory, or may also be disposed on the processor chip, which is not limited in the present disclosure. For ease of description, the checking device is shown as a separate unit in FIG. 5. It should be understood that the memory access operation recording unit 501 and the data organization unit 502 may be implemented as part of the checking device and cooperate with other parts of the checking device to complete the security checking process. Similarly, the various units described below can be implemented as part of the checking device.

Figure 6:
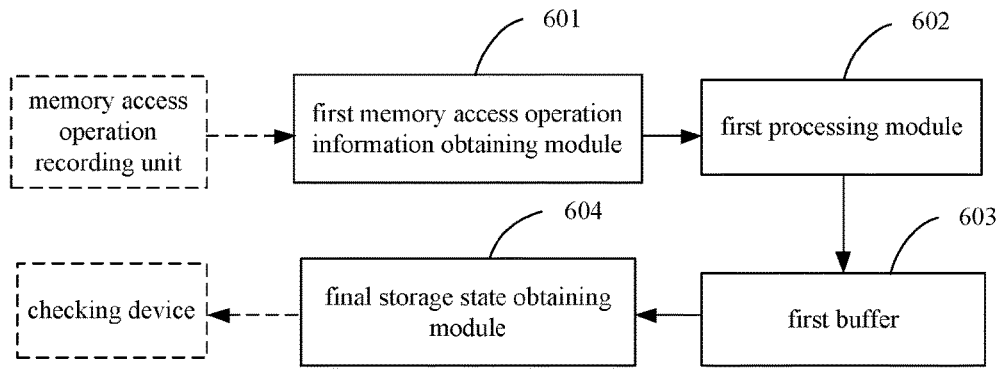
FIG. 6 is a schematic structural diagram of the data organization unit 502 according to an embodiment of the present disclosure.

In an embodiment, the structure of the data organization unit 501 is shown in FIG. 6 (the solid line part in the figure), and includes a first memory access operation information obtaining module 601, a first processing module 602, a first buffer 603, and a final storage state obtaining module 604. The first memory access operation information obtaining module 601 is configured to obtain a first memory access operation information in the memory access sequence information; the first processing module 602 is configured to write the first memory access operation information into the first buffer 603 when the memory access type of the first memory access operation information is a write operation; and the final storage state obtaining module 604 is configured to obtain the final storage state from the first buffer.

In an embodiment, the first processing module 602 is configured to: determine whether the memory access address of the first memory access operation information is already recorded in the first buffer 603; write the first memory access operation information into the first buffer 603 to overwrite a previous memory access operation information when the memory access address of the first memory access operation information is already recorded in the first buffer 603; and insert the first memory access operation information to the first buffer 603 when the memory access address of the first memory access operation information is not recorded in the first buffer 603.

Figure 7:
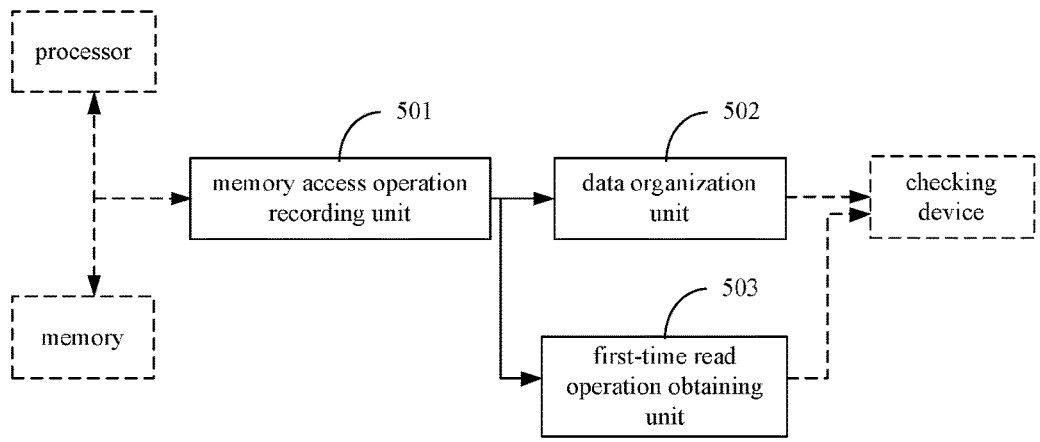
FIG. 7 is a schematic structural diagram of a device for determining the security of the processor based on the memory access operation information according to an embodiment of the present disclosure.

In an embodiment, the device as shown in FIG. 5 further includes a first-time read operation obtaining unit 503 (referring to FIG. 7 for details), configured to obtain the memory access operation information corresponding to the first-time read operation during the target running process from the memory access sequence information. The memory access data in the memory access operation information corresponding to the first-time read operation may be used as input information or initial running state of a checking device and the checking device is caused to execute a task of the target running process in a manner conforming to predefined behavior. The predefined behavior is a hardware behavior standard of the processor. In another scenario, when the memory is integrated with the processor, the memory access data corresponding to the first-time read operation may be used as part of the initial running state of the checking device.

Figure 8:
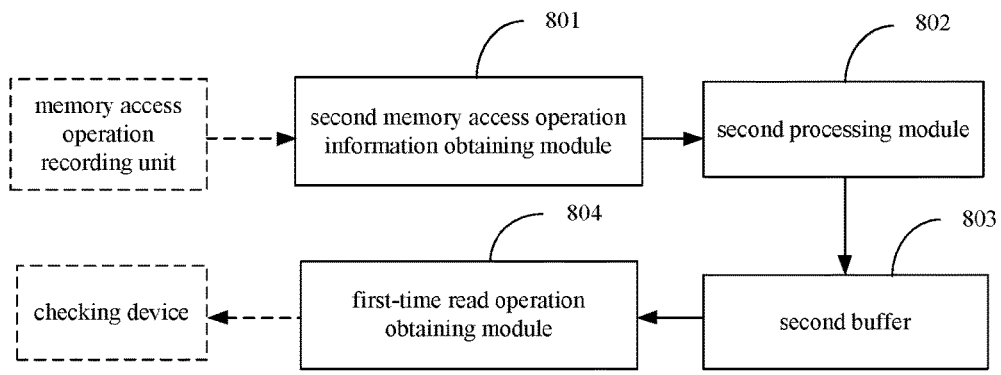
FIG. 8 is a schematic structural diagram of first-time read operation obtaining unit 503 according to an embodiment of the present disclosure.

In an embodiment, the structure of the first-time read operation obtaining unit 503 is shown as the solid line part in FIG. 8 and includes: a second memory access operation information obtaining module 801, a second processing module 802, a second buffer 803, and a first-time read operation obtaining module 804. The second memory access operation information obtaining module 801 is configured to obtain a second memory access operation information in the memory access sequence information; the second processing module 802 is configured to write the second memory access operation information into the second buffer 803 when the memory access type of the second memory access operation information is a read operation; and the first-time read operation obtaining module 804 is configured to obtain the memory access operation information corresponding to the first-time read operation from the second buffer.

Figure 9:
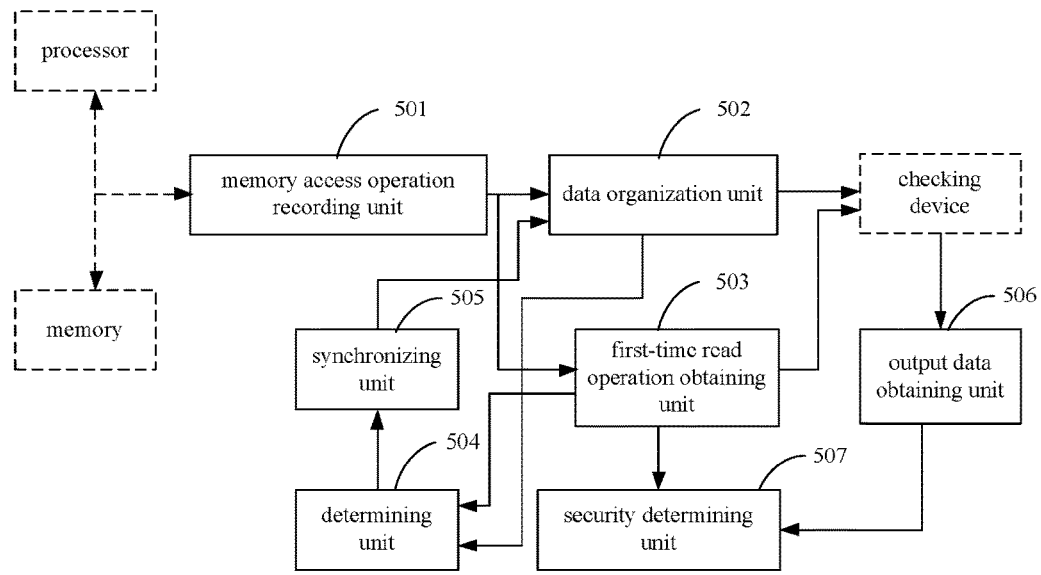
FIG. 9 is a schematic structural diagram of a device for determining the security of the processor based on the memory access operation information according to another embodiment of the present disclosure.

In an embodiment, the device for recording memory access operation information further includes a determining unit 504, a synchronizing unit 505, an output data obtaining unit 506, and a security determining unit 507, and the structure thereof is shown in FIG. 9.

The determining unit 504 is configured to determine whether the memory access address of the second memory access operation information is already recorded in the first buffer 603 when the memory access type of the second memory access operation information is a read operation; the synchronization unit 505 is configured to write the second memory access operation information into the first buffer when the memory access address of the second memory access operation information is not recorded in the first buffer; the output data obtaining unit 506 is configured to write output data of the checking device into the second buffer 803 when the checking device executes the task of the target running process; and the security determining unit 507 is configured to sequentially traverse and compare memory access data and memory access type corresponding to the same memory access address in the second buffer 803 and the first buffer 603 to determine whether the processor is secure.

In an embodiment, when the output data obtaining unit 506 writes output data of the checking device into the second buffer 803 when the checking device executes the task of the target running process, the determining unit 504 is further configured to determine whether the memory access address of the output data is already recorded in the first buffer 603; the security determining unit 507 is configured to determine whether the processor is secure according to the final storage state of the memory during the target running process when the memory access address of the output data is already recorded in the first buffer 603.

In an embodiment, determining whether the processor is secure according to the final storage state of the memory during the target running process by the security determining unit 507 may comprise: traversing the memory access operation information in the first buffer 603 to determine whether a same memory access data corresponding to a same memory access address is already recorded in the second buffer 803; determining that the processor is secure when the same memory access data corresponding to the same memory access address is already recorded in the second buffer 803; determining that the processor is not secure when the same memory access data corresponding to the same memory access address is not recorded in the second buffer 803.

In an embodiment, the memory access operation recording unit 501 is further configured to obtain an address range to be checked and select the memory access operation to be recorded during the target running process according to the address range to be checked.

The method and device for recording memory access operation information provided by the present disclosure records memory access operation between a processor and a memory during a target running process and determines a final running state of the processor through the memory access sequence information. In this way, the final storage state of the memory during the target running process may be obtained by using less storage resources, and the hardware overhead is reduced.

In addition, according to the above embodiment of the present disclosure, memory access operations between a processor and a memory during a target running process are recorded and whether the processor is secure during the target running process is determined according to the obtained final storage state of the memory. Therefore, it is possible to effectively check whether the behavior of the checked processor is abnormal during the target running process, reduce the difficulty of hardware security checking, and improve the security of using the hardware. Meanwhile, the checking content may be customised by a user, having good portability, and may be applied to hardware security checks for different models of processors, thereby solving the problem of the hardware black box of the processors and reducing the checking difficulty.

It should be understood that the buffer referred to in the present disclosure may be implemented as any type of memory, and the embodiment of the present disclosure is not limited thereto.

An electronic device is further provided by an embodiment of the present disclosure. The electronic device may be a desktop computer or the like, which is not limited in this embodiment. In this embodiment, the electronic device can be implemented by referring to the method shown in FIG. 1 and the device shown in FIG. 5, the content of which is incorporated here, and details are not described herein again.

Figure 10:
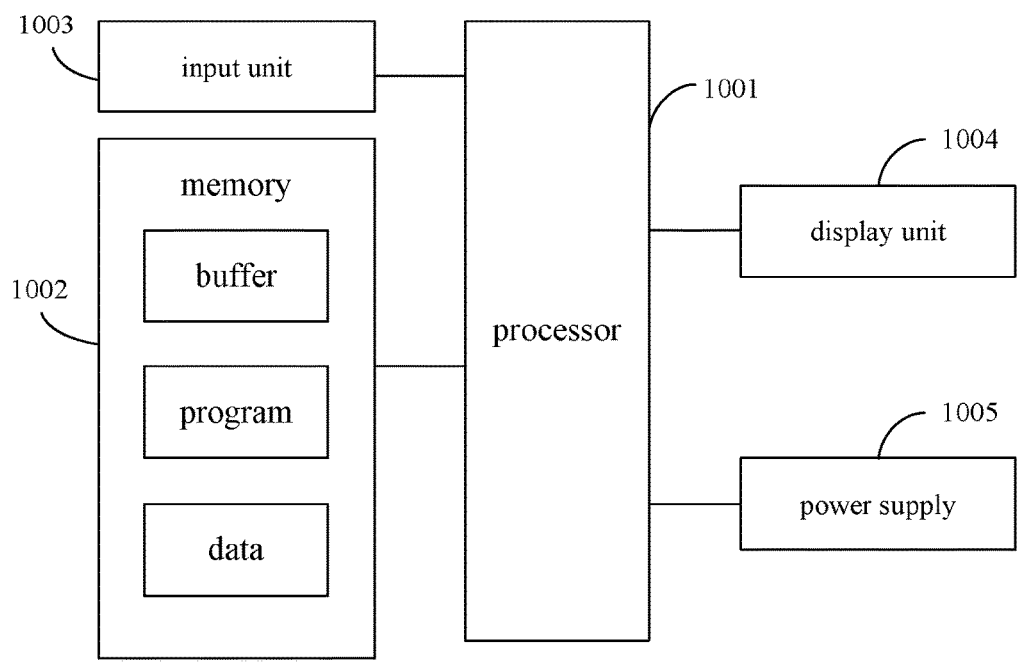
FIG. 10 is a schematic block diagram of a system configuration of an electronic device according to an embodiment of the present disclosure.

FIG. 10 is a schematic block diagram of a system configuration of an electronic device according to an embodiment of the present disclosure. As shown in FIG. 6, the electronic device may include a processor 1001 and a memory 1002, where the memory 1002 is coupled to the processor 1001. It is noted that this figure is exemplary and that other types of structures may also be used to supplement or substitute this structure for communication, checking or other functions.

In an embodiment, the function of recording memory access operations between the processor and the memory during the target running process may be integrated into the processor 1001. The processor 1001 may be configured to control to: record memory access operations between a processor and a memory during a target running process to form an memory access sequence information of the target running process, wherein each memory access operation information in the memory access sequence information includes a memory access type, a memory access address and a memory access data; and determine a final storage state of the memory during the target running process according to the memory access sequence information of the target running process. In an embodiment, the final storage state is used to determine whether the processor is secure during the target running process.

Determining the final storage state of the memory during the target running process according to the memory access sequence information of the target running process comprises: obtaining a first memory access operation information in the memory access sequence information; writing the first memory access operation information into a first buffer when the memory access type of the first memory access operation information is a write operation; and obtaining the final storage state from the first buffer.

Writing the first memory access operation information into the first buffer when the memory access type of the first memory access operation information is a write operation comprises: determining whether the memory access address of the first memory access operation information is already recorded in the first buffer; writing the first memory access operation information into the first buffer to overwrite a previous memory access operation information when the memory access address of the first memory access operation information is already recorded in the first buffer; inserting the first memory access operation information to the first buffer when the memory access address of the first memory access operation information is not recorded in the first buffer.

The processor 1001 may be further configured to control to: obtain the memory access operation information corresponding to a first-time read operation during the target running process from the memory access sequence information, take the memory access data in the memory access operation information corresponding to the first-time read operation as input information or initial finning state of a checking device and cause the checking device to execute a task of the target running process in a manner conforming to predefined behavior, wherein the predefined behavior is a standard of hardware behavior of the processor.

Obtaining the memory access operation information corresponding to the first-time read operation during the target running process from the memory access sequence information comprises: obtaining a second memory access operation information in the memory access sequence information; writing the second memory access operation information into the second buffer when the memory access type of the second memory access operation information is a read operation; and obtaining the memory access operation information corresponding to the first-time read operation from the second buffer.

The processor 1001 may be further configured to control to: determine whether the memory access address of the second memory access operation information is already recorded in the first buffer when the memory access type of the second memory access operation information is a read operation; write the second memory access operation information into the first buffer when the memory access address of the second memory access operation information is not recorded in the first buffer; write output data of the checking device into the second buffer when the checking device executes the task of the target running process; and sequentially traverse and compare memory access data and memory access type corresponding to the same memory access address in the second buffer and the first buffer to determine whether the processor is secure.

In an embodiment, the processor 1001 may be further configured to control to: write output data of the checking device into the second buffer when the checking device executes the task of the target running process; determine whether the memory access address of the output data is already recorded in the first buffer; and determine whether the processor is secure according to the final storage state of the memory during the target running process when the memory access address of the output data is already recorded in the first buffer.

Determining whether the processor is secure according to the final storage state of the memory during the target running process comprises: traversing the memory access operation information in the first buffer to determine whether a same memory access data corresponding to a same memory access address is already recorded in the second buffer; determining that the processor is secure when the same memory access data corresponding to the same memory access address is already recorded in the second buffer; determining that the processor is not secure when the same memory access data corresponding to the same memory access address is not recorded in the second buffer.

Before recording memory access operations between the processor and the memory during the target running process, the processor 1001 may be further configured to control to: obtain an address range to be checked and select the memory access operation to be recorded during the target running process according to the address range to be checked.

In another embodiment, the device for recording memory access operation information may be configured separately from the processor 1001. For example, the device for recording memory access operation information may be configured as a chip connected to the processor 1001 and controlled by the processor 1001 to record memory access operation information.

As shown in FIG. 10, the electronic device may further include an input unit 1003, a display unit 1004 and a power supply 1005. Please note that the electronic device does not have to include all the components shown in FIG. 10. In addition, the electronic device may further include components not shown in FIG. 10, and reference may be made to the related art.

As shown in FIG. 10, the processor 1001, sometimes referred to as a controller or operation control, may include a microprocessor or other processor device and/or logic device. The processor 1001 receives input and controls the operation of various components of the electronic device.

The memory 1002 may be, for example, a buffer, a flash memory, a hard drive, a removable medium, a volatile memory, a non-volatile memory or other suitable device, and may store the configuration information of the processor 1001, the instruction executed by the processor 1001, recorded information such as the memory access sequence information, and the like. The processor 1001 may execute a program stored in the memory 1002 to realize information storage or processing and the like. In an embodiment, a buffer memory, i.e., a buffer, is also included in the memory 1002 to store the intermediate information.

The input unit 1003 may be, for example, a key input device or a touch input device for providing input to the processor 1001. The display unit 1004 is configured to display a display object such as an image or a text. The display unit may be, for example, an LCD display, but the present disclosure is not limited thereto. The power supply 1005 is configured to supply power to the electronic device.

A computer-readable instruction, when executed in an electric device, capable of causing the electric device to execute the method for recording memory access operation information as shown in FIG. 1 is further provided by the embodiments of the present disclosure.

A storage medium storing computer-readable instructions capable of causing an electric device to execute the method for recording memory access operation information as shown in FIG. 1 is further provided by the embodiments of the present disclosure.

It should be understood that, in various embodiments of the present disclosure, the sequence numbers of the foregoing processes do not mean the order of execution. The execution sequence of each process should be determined by its function and inherent logic, and should not constitute any limitation on the implementation process of the embodiments of the present disclosure.

It should also be understood that in the embodiments of the present disclosure, the term "and/or" is merely a description of the relationships of associated objects, indicating that there may exist three relationships. For example, A and/or B may represent the following three cases: A exists alone, A and B exist together, and B exists alone. In addition, the character "/" herein generally means that there is an "or" relationship between the associated objects before and after the character.

Persons of ordinary skill in the art may be aware that the units and algorithm steps of each example described in conjunction with the embodiments disclosed herein may be implemented by electronic hardware, computer software, or a combination thereof. To clearly describe the interchangeability of hardware and software, the composition and the steps of the examples have been generally described in terms of their functions. Whether these functions are implemented by hardware or software depends on the specific application and design constraints of the technical solutions. A person skilled in the art may use different methods to implement the described functions for each particular application, but such implementation should not be considered as beyond the scope of the present disclosure.

Those skilled in the art may clearly understand that, for the convenience and simplicity of the description, reference may be made to corresponding processes in the foregoing method embodiments for the specific working process of the foregoing system, device, and unit, and details are not described herein again.

In the several embodiments provided in the present application, it should be understood that the disclosed system, device, and method may be implemented in other manners. For example, the device embodiments described above are merely exemplary. For example, the unit division is merely logical function division and may be otherwise divided in actual implementation. For example, multiple units or components may be combined or may be integrated into another system, or some features can be ignored or not executed. In addition, the mutual coupling or direct coupling or communication connection shown or discussed may be indirect coupling or communication connection through some interfaces, devices or units, and may also be electrical, mechanical or other forms of connection.

The units described as separate components may or may not be physically separated. The components displayed as units may or may not be physical units, that is, may be located in one place or may also be distributed to multiple network units. Some or all of the units may be selected according to actual needs to achieve the objectives of the solutions in the embodiments of the present disclosure.

In addition, each functional unit in each embodiment of the present disclosure may be integrated in one processing unit, or each unit may exist alone physically, or two or more units may be integrated in one unit. The above-mentioned integrated unit may be implemented in the form of hardware or in the form of software functional unit.

When the integrated unit is implemented in the form of software functional unit and is sold or used as an independent product, the integrated unit may be stored in a computer-readable storage medium. Based on such understanding, the technical solution of the present disclosure essentially, or the part contributing to the prior art, or all or part of the technical solution may be embodied in the form of a software product stored on a storage medium including several instructions for enabling a computer device (which may be a personal computer, a server, a network device, or the like) to execute all or part of the steps of the method according to each embodiment of the present disclosure. The foregoing storage medium includes various medium capable of storing program code such as a USB flash disk, a removable hard disk, a read-only memory (ROM), a random access memory (RAM), a magnetic disk, or an optical disk.

In the present disclosure, specific embodiments are used to describe the principle and implementation manners of the present disclosure. The description of the foregoing embodiments is merely used to help understand the method and core idea of the present disclosure. Meanwhile, for those skilled in the art, the idea of the present disclosure may have variations in specific implementation manners and application scope. To sum up, the content of the description should not be construed as a limitation on the present disclosure.

What is claimed is:

1. A method for recording memory access operation information, comprising:
    recording memory access operations between a processor and a memory during a target running process to form a memory access sequence information of the target running process, wherein each of the memory access operation information in the memory access sequence information includes a memory access type, a memory access address and a memory access data; and
    determining a final storage state of the memory during the target running process according to the memory access sequence information of the target running process, wherein the final storage state refers to a final storage state of a memory space operated by the processor during the target running process,
    wherein determining the final storage state of the memory during the target running process according to the memory access sequence information of the target running process comprises:
        obtaining a first memory access operation information in the memory access sequence information;
        writing the first memory access operation information into a first buffer when the memory access type of the first memory access operation information is a write operation; and
        obtaining the final storage state from the first buffer,
    wherein writing the first memory access operation information into the first buffer when the memory access type of the first memory access operation information is a write operation comprises:
        determining whether the memory access address of the first memory access operation information is already recorded in the first buffer;
        writing the first memory access operation information into the first buffer to overwrite a previous memory access operation information when the memory access address of the first memory access operation information is already recorded in the first buffer; and
        inserting the first memory access operation information into the first buffer when the memory access address of the first memory access operation information is not recorded in the first buffer.

2. The method according to claim 1, further comprising:
    obtaining the memory access operation information corresponding to a first-time read operation during the target running process from the memory access sequence information; and
    taking the memory access data in the memory access operation information corresponding to the first-time read operation as an input information or an initial running state of a checking device such that the checking device executes a task of the target running process in a manner conforming to a predefined behavior, wherein the predefined behavior is a hardware behavior standard of the processor.

3. The method according to claim 1, further comprising:
    obtaining the memory access operation information corresponding to a first-time read operation during the target running process from the memory access sequence information; and
    taking the memory access data in the memory access operation information corresponding to the first-time read operation as an input information or an initial running state of a checking device such that the checking device executes a task of the target running process in a manner conforming to a predefined behavior, wherein the predefined behavior is a hardware behavior standard of the processor.

4. The method according to claim 2, wherein obtaining the memory access operation information corresponding to a first-time read operation during the target running process from the memory access sequence information comprises:
    obtaining a second memory access operation information in the memory access sequence information;
    writing the second memory access operation information into a second buffer when the memory access type of the second memory access operation information is a read operation; and
    obtaining the memory access operation information corresponding to the first-time read operation from the second buffer.

5. The method according to claim 4, further comprising:
    determining whether a memory access address of the second memory access operation information is already recorded in the first buffer when the memory access type of the second memory access operation information is a read operation;
    writing the second memory access operation information into the first buffer when the memory access address of the second memory access operation information is not recorded in the first buffer;
    writing an output data of the checking device into the second buffer when the checking device executes the task of the target running process; and
    sequentially traversing and comparing the memory access data and the memory access type corresponding to a same memory access address in the second buffer and the first buffer to determine whether the processor is secure.

6. The method according to claim 4, further comprising:
    writing an output data of the checking device into the second buffer when the checking device executes the task of the target running process;
    determining whether a memory access address of the output data is already recorded in the first buffer; and
    determining whether the processor is secure according to the final storage state of the memory during the target running process when the memory access address of the output data is already recorded in the first buffer.

7. The method according to claim 6, wherein determining whether the processor is secure according to the final storage state of the memory during the target running process comprises:
    traversing the memory access operation information in the first buffer to determine whether a same memory access data corresponding to a same memory access address is already recorded in the second buffer;
    determining that the processor is secure when the same memory access data corresponding to the same memory access address is already recorded in the second buffer; and
    determining that the processor is not secure when the same memory access data corresponding to the same memory access address is not recorded in the second buffer.

8. The method according to claim 1, wherein before recording the memory access operations between the processor and the memory during the target running process, the method further comprises:
    obtaining an address range to be checked; and
    selecting the memory access operation to be recorded during the target running process according to the address range to be checked.

9. A device for recording memory access operation information, comprising:
    a memory access operation recording unit, configured to record memory access operations between a processor and a memory during a target running process to form a memory access sequence information of the target running process, wherein each of the memory access operation information in the memory access sequence information includes a memory access type, a memory access address and a memory access data; and
    a data organization unit, configured to determine a final storage state of the memory during the target running process according to the memory access sequence information of the target running process, wherein the final storage state refers to a final storage state of a memory space operated by the processor during the target running process,
    wherein the data organization unit comprises: a first memory access operation information obtaining module, a first processing module, a first buffer, and a final storage state obtaining module; wherein
    the first memory access operation information obtaining module is configured to obtain a first memory access operation information in the memory access sequence information;
    the first processing module is configured to write the first memory access operation information into the first buffer when the memory access type of the first memory access operation information is a write operation; and
    the final storage state obtaining module is configured to obtain the final storage state from the first buffer,
    wherein the first processing module is configured to:
        determine whether the memory access address of the first memory access operation information is already recorded in the first buffer;
        write the first memory access operation information into the first buffer to overwrite a previous memory access operation information when the memory access address of the first memory access operation information is already recorded in the first buffer; and
        insert the first memory access operation information into the first buffer when the memory access address of the first memory access operation information is not recorded in the first buffer.

10. The device according to claim 9, further comprising:
    a first-time read operation obtaining unit, configured to obtain the memory access operation information corresponding to a first-time read operation during the target running process from the memory access sequence information,
    wherein the memory access data in the memory access operation information corresponding to the first-time read operation is used as an input information or an initial running state of a checking device such that the checking device executes a task of the target running process in a manner conforming to a predefined behavior, wherein the predefined behavior is a hardware behavior standard of the processor.

11. The device according to claim 9, further comprising:
    a first-time read operation obtaining unit, configured to obtain the memory access operation information corresponding to a first-time read operation during the target running process from the memory access sequence information,
    wherein the memory access data in the memory access operation information corresponding to the first-time read operation is used as an input information or an initial running state of a checking device such that the checking device executes a task of the target running process in a manner conforming to a predefined behavior, wherein the predefined behavior is a hardware behavior standard of the processor.

12. The device according to claim 10, wherein the first-time read operation obtaining unit comprises: a second memory access operation information obtaining module, a second processing module, a second buffer, and a first-time read operation obtaining module; wherein
    the second memory access operation information obtaining module is configured to obtain a second memory access operation information in the memory access sequence information;
    the second processing module is configured to write the second memory access operation information into the second buffer when the memory access type of the second memory access operation information is a read operation; and
    the first-time read operation obtaining module is configured to obtain the memory access operation information corresponding to the first-time read operation from the second buffer.

13. The device according to claim 12, further comprising: a determining unit, a synchronization unit, an output data obtaining unit, and a security determining unit; wherein
    the determining unit is configured to determine whether the memory access address of the second memory access operation information is already recorded in the first buffer when the memory access type of the second memory access operation information is a read operation;
    the synchronization unit is configured to write the second memory access operation information into the first buffer when the memory access address of the second memory access operation information is not recorded in the first buffer;

the output data obtaining unit is configured to write an output data of the checking device into the second buffer when the checking device executes the task of the target running process; and the security determining unit is configured to sequentially traverse and compare the memory access data and the memory access type corresponding to a same memory access address in the second buffer and the first buffer to determine whether the processor is secure.

14. The device according to claim 13, wherein the output data obtaining unit is configured to write output data of the checking device into the second buffer when the checking device executes the task of the target running process;

the determining unit is further configured to determine whether the memory access address of the output data is already recorded in the first buffer; and the security determining unit is further configured to determine whether the processor is secure according to the final storage state of the memory during the target running process when the memory access address of the output data is already recorded in the first buffer.

15. The device according to claim 14, wherein determining whether the processor is secure according to the final storage state of the memory during the target running process when the memory access address of the output data is already recorded in the first buffer by the security determining unit comprises:

traversing the memory access operation information in the first buffer to determine whether a same memory access data corresponding to a same memory access address is already recorded in the second buffer;

determining that the processor is secure when the same memory access data corresponding to the same memory access address is already recorded in the second buffer;

determining that the processor is not secure when the same memory access data corresponding to the same memory access address is not recorded in the second buffer.

16. The device according to claim 9, wherein the memory access operation recording unit is further configured to obtain an address range to be checked and select the memory access operation to be recorded during the target running process according to the address range to be checked.

* * * * *